United States Patent
Icart et al.

(10) Patent No.: US 10,027,483 B2
(45) Date of Patent: *Jul. 17, 2018

(54) CRYPTOGRAPHY ON AN ELLIPTICAL CURVE

(71) Applicant: MORPHO, Paris (FR)

(72) Inventors: Thomas Icart, Paris (FR); Jean-Sebastien Coron, Asnieres-sur-Seine (FR)

(73) Assignee: MORPHO, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/671,064

(22) Filed: Aug. 7, 2017

(65) Prior Publication Data

US 2017/0359176 A1 Dec. 14, 2017

Related U.S. Application Data

(63) Continuation of application No. 15/178,528, filed on Jun. 9, 2016, which is a continuation-in-part of
(Continued)

(30) Foreign Application Priority Data

Jun. 16, 2009 (FR) ..................... 09 54053

(51) Int. Cl.
  *G06F 7/72* (2006.01)
  *H04L 9/00* (2006.01)
  *H04L 9/30* (2006.01)

(52) U.S. Cl.
  CPC ............... *H04L 9/30* (2013.01); *H04L 9/005* (2013.01); *H04L 9/3066* (2013.01); *G06F 7/725* (2013.01); *H04L 9/002* (2013.01)

(58) Field of Classification Search
  CPC ... G06F 7/60; G06F 7/72; G06F 7/724; G06F 7/725; H04L 9/002; H04L 9/003; H04L 9/005; H04L 9/30
  See application file for complete search history.

(56) References Cited

U.S. PATENT DOCUMENTS 6,876,745 B1  4/2005  Kurumatani
7,079,650 B1 * 7/2006 Knudsen ............... G06F 7/725
                                                        380/28
(Continued)

FOREIGN PATENT DOCUMENTS

WO  WO-0005837  2/2000

OTHER PUBLICATIONS

Shallue et al., Construction of Rational Points on Elliptic Curves over Finite Fields, Springer-Verlag, LNCS 4076, pp. 510-524 (Year: 2006).*

(Continued)

*Primary Examiner* — Khang D Do
(74) *Attorney, Agent, or Firm* — Womble Bond Dickinson (US) LLP (57) ABSTRACT

A cryptographic calculation includes obtaining a point $P(X, Y)$ from a parameter $t$ on an elliptical curve $Y^2 = f(X)$; and from polynomials $X_1(t)$, $X_2(t)$, $X_3(t)$ and $U(t)$ satisfying: $f(X_1(t)) \cdot f(X_2(t)) \cdot f(X_3(t)) = U(t)^2$ in $F_q$, with $q \equiv 3 \bmod 4$. Firstly a value of the parameter $t$ is obtained. Next, the point $P$ is determined by: (i) calculating $X_1 = X_1(t)$, $X_2 = X_2(t)$, $X_3 = X_3(t)$ and $U = U(t)$; (ii) if the term $f(X_1) \cdot f(X_2)$ is a square, then testing whether the term $f(X_3)$ is a square in $F_q$ and if so calculating the square root of $f(X_3)$ in order to obtain the point $P(X_3)$; (iii) otherwise, testing whether the term $f(X_1)$ is a square and, if so, calculating the square root of $f(X_1)$ in order to obtain the point $P(X_1)$; (iv) otherwise, calculating the square root of $f(X_2)$ in order to obtain the (Continued)

point P(X2). This point P is useful in a cryptographic application.

6 Claims, 4 Drawing Sheets

Related U.S. Application Data application No. 14/261,959, filed on Apr. 25, 2014, which is a continuation of application No. 13/377,404, filed as application No. PCT/FR2010/051190 on Jun. 15, 2010, now Pat. No. 8,718,276.

(56) References Cited

U.S. PATENT DOCUMENTS

| | | | |
|---|---|---|---|
| 8,184,803 B2* | 5/2012 | Ghouti | H04L 9/0643 380/28 |
| 8,225,109 B1 | 7/2012 | Kalligudd | |
| 2001/0002486 A1 | 5/2001 | Kocher et al. | |
| 2002/0101987 A1 | 8/2002 | Koc et al. | |
| 2003/0059042 A1 | 3/2003 | Okeya et al. | |
| 2004/0039911 A1 | 2/2004 | Oka et al. | |
| 2004/0252834 A1 | 12/2004 | Nishimura et al. | |
| 2006/0239459 A1 | 10/2006 | Yamamichi et al. | |
| 2007/0121933 A1* | 5/2007 | Futa | H04L 9/3066 380/1 |
| 2008/0170695 A1 | 7/2008 | Adler et al. | |
| 2009/0180612 A1* | 7/2009 | Leu | H04N 7/17318 380/200 |
| 2010/0293379 A1 | 11/2010 | Nie | |

OTHER PUBLICATIONS

Non-Final Office Action dated Oct. 4, 2016, U.S. Appl. No. 15/178,528.
Notice of Allowance dated Apr. 13, 2017, U.S. Appl. No. 15/178,528.
PCT Search Report for PCT/FR2010/051190 dated Jan. 17, 2011 (6 pages).
Shallue, et al., "Construction of Rational Points on Elliptic Curves over Finite Fields", Springer-Verlag, LNCS 4076, 2006, pp. 510-524.
Ulas, Maciej, "Rational Points on Certain Hyperelliptic Curves Over Finite Fields", Mathematics Subject Classification, Primary 11D25, 11D41; Secondary 14G15, 2000, 1-9.

* cited by examiner

CRYPTOGRAPHY ON AN ELLIPTICAL CURVE

PRIORITY CLAIM

This application is a continuation of co-pending U.S. patent application Ser. No. 15/178,528, filed Jun 9, 2016, which is a continuation in part of U.S. patent application Ser. No. 14/261,959, filed Apr. 25, 2014 which claims the benefit of U.S Pat. No. 8,718,276 issued May 6, 2016, which is a 371 filing from PCT/FR2010/051190 (published as WO 2010/146302) filed Jun. 5, 2010 which claims the benefit of French Application for Patent No. 09-54053 filed Jun. 16, 2009, the disclosure of which are hereby incorporated by reference.

TECHNICAL FIELD

The present invention relates to message cryptography based on the use of points on an elliptical curve, and more particularly said cryptography of a deterministic nature.

BACKGROUND

In order to apply a cryptographic calculation to a message, conventionally algorithms are employed for inserting arbitrary values into mathematical structures. For this purpose, the elliptical curves are mathematical structures that are able to facilitate the application of such cryptographic calculations and at the same time save space in memory relative to the use of other cryptographic calculations.

However, efficient algorithms for inserting arbitrary values using elliptical curves are probabilistic. Consequently, the application time of these algorithms is not constant, it depends on the message to be encoded. Thus, if an attacker determines different application times of the algorithm applied, he can obtain information about the coded message.

In order to mask the time taken by a probabilistic insertion algorithm, it is possible to provide the addition of unnecessary steps in this algorithm so that its application always extends over a period of time of identical length, regardless of the message processed.

A point P of an elliptical curve is defined by its abscissa X and its ordinate Y, X and Y satisfying the following equation:

$$f(X) = Y^2 \quad (1)$$

where f(X) is the polynomial $f(X) = X^3 + aX + b$

A family of polynomials is known, which satisfy Skalba's equality which makes it possible to determine such a point on an elliptical curve, as defined in the document 'Construction of Rational Points on Elliptic curves over finite fields' by Andrew Shallue and Christiaan van de Woestijne.

Polynomials X1(t), X2(t), X3(t) and U(t) satisfy Skalba's equality if they satisfy the following equation:

$$f(X_1(t)) \cdot f(X_2(t)) \cdot f(X_3(t)) = U^2(t) \quad (2)$$

where f is the function that defines the elliptical curve under consideration, and
where t is a parameter.

The polynomials that satisfy Skalba's equality can take two parameters u and t. In this case, Skalba's equality is written:

$$f(X1(t,u)) \cdot f(X2(t,u)) \cdot f(X3(t,u)) = U^2(t,u)$$

Equations of this type can be used with two parameters u and t. However, in the proposed applications, we can advantageously envisage setting u, or alternatively setting t, at any value. Thus, the value of a single parameter remains to be chosen.

Given selected parameters t and u, it is noted that X1=X1(t,u), X2=X2(t,u), X3=X3(t,u), U=U(t,u), where X1, X2, X3 and U are elements of Fq. This equation (2) signifies that at least one of the values f(X1), f(X2) and f(X3) corresponds to a squared term in the finite field Fq.

Then, once the squared term in Fq, f(Xi), is identified, we can then obtain a point on the elliptical curve P(Xi, $\sqrt{f(X_i)}$).

Calculation of $\sqrt{f(X_i)}$ can be performed by means of an exponentiation calculation when the characteristic q of the field Fq satisfies:

$$q = 3 \mod 4$$

In this case, it is known that:

$$\sqrt{f(X_i)} = f(X_i)^{(q+1)/4} \quad (3)$$

In order to determine a point on the elliptical curve (1), it is therefore necessary to determine which value among the three values f(X1), f(X2) and f(X3) corresponds to a squared term in the finite field Fq. For this purpose we could envisage checking firstly whether the term f(X1) is a squared term in the finite field Fq, then, if it is not the case, apply this same check to the term f(X2), and finally if this is still not so, check the term f(X3) similarly. However, following this procedure, determination of a point on the elliptical curve does not always take the same time, since this determination is executed more quickly if the first term tested is a squared term than if only the third term is a squared term.

A potential attacker could make use of this difference in elapsed time to determine a point on the elliptical curve for breaking the secret linked to the parameter that enabled this point to be generated. Now, in the field of cryptography, these parameters must remain secret.

These parameters can in particular correspond to passwords. Thus, it is important that determination of these points does not in itself supply information that makes it possible to break the secret of the parameter, and accordingly, attacks based on an analysis of the elapsed time for determining a point on the curve are to be avoided.

To overcome this disadvantage, it would be possible to check the three terms f(Xi) systematically for i in the range from 1 to 3. Thus, the time for determining a point on the curve would no longer be a function of the point determined.

However, checking whether a term of equation (2) is a squared term in the finite field Fq is a complex operation in particular employing an exponentiation, which is costly in execution time. In the case when we wish to determine a point on an elliptical curve on the basis of Skalba's equalities, while performing these determinations in a constant time, four operations of exponentiation are required in the case described above, one exponentiation per check of each of the terms of Skalba's equation (2) and one exponentiation for calculating the square root, as described in equation (3).

The present invention aims to improve this situation.

SUMMARY

A first aspect of the present invention proposes a method of execution of a cryptographic calculation in an electronic component (As used herein, "electronic component" is defined as a general purpose or dedicated computer programmed to execute instructions which perform the cryptographic calculation described in detail below comprising a step of obtaining a point P(X,Y) starting from at least one parameter t, on an elliptical curve satisfying the equation:

$$Y^2 = f(X); \text{ and}$$

starting from polynomials X1(t), X2(t), X3(t) and U(t) satisfying Skalba's equality:

$$f(X1(t)) \cdot f(X2(t)) \cdot f(X3(t)) = U(t)^2$$

in the finite field Fq, regardless of the parameter t, q satisfying the equation q=3 mod 4;
said method comprising the following steps:
/1/ obtain a value of the parameter t;
121 determine point P by executing the following substeps:
/i/ calculate X1=X1(t), X2=X2(t), X3=X3(t) and U=U(t)
/ii/ if the term f(X1)·f(X2) is a squared term in the finite field Fq then test whether the term f(X3) is a squared term in the finite field Fq and calculate the square root of the term f(X3), point P having X3 as abscissa and the square root of the term f(X3) as ordinate;
/iii/ otherwise, test whether the term f(X1) is a squared term in the finite field Fq and in this case, calculate the square root of the term f(X1), point P having X1 as abscissa and the square root of the term f(X1) as ordinate;
/iv/ otherwise, calculate the square root of the term f(X2), point P having X2 as abscissa and the square root of the term f(X2) as ordinate;
131 use said point P in a cryptographic application of encryption or hashing or signature or authentication or identification.

Thanks to these arrangements, it is possible to determine a point on an elliptical curve in a manner suitable for use in the field of cryptography, since on the one hand this determination takes the same time regardless of the input parameter t and on the other hand it is efficient as the number of demanding operations is reduced.

This determination takes a constant time that does not depend on the input parameter or parameters. In fact, even if this method offers different processing options depending on the term that corresponds to a squared term in Skalba's equality, the same number of operations of the same type is performed regardless of the point on the curve that is determined. More precisely, regardless of the point on the curve that is determined, the following list of operations is executed:
test for a squared term in Fq;
determination of a square root.

Therefore it is not possible to launch an attack of the 'timing attack' type.

Moreover, this determination is efficient since the number of costly operations employed is limited. In fact, it is possible to check whether one of the three terms of Skalba's equation (2) is a squared term in the finite field Fq, by using at most two operations of the exponentiation type. More precisely, it should be noted that, in one embodiment of the present invention, the test for a squared term corresponds to an exponentiation, which is the most demanding operation to be employed in the present context.

At step /2/-/ii/, it is necessary to decide whether the term Ro:

$$R_0 = f(X_1) \cdot f(X_2)$$

is a squared term.

This step can correspond to a test for a squared term, which employs an additional exponentiation, or it can be based on a pre-calculated value obtained from an earlier calculation in the case when a polynomial satisfying Skalba's equality corresponds to a term that can never be a squared term. In the latter case, which is presented in the following sections, application of a method advantageously requires just one exponentiation. But in the worst case, application of a method according to one embodiment of the present invention corresponds to two exponentiations, one for the test for a squared term applied to Ro, and another exponentiation for the test for a squared term applied either to f(X3) or to f(X1).

During execution of such calculations according to one embodiment of the present invention, the time taken for carrying out the operations other than an exponentiation is negligible relative to the time taken by the application of an exponentiation. Now, owing to the characteristics of the present invention, instead of four exponentiations, as described previously in a conventional case, two exponentiations are required at most. Such a reduction in the number of exponentiations is very advantageous.

In one embodiment of the present invention, at step /2/-/ii/, the following steps are executed:
calculate R1 such that:

$$R1 = (f(X1) \cdot f(X2))^{\frac{q+1}{4}}$$

if $Ri^2$ is equal to f(X1)·f(X2), then decide that the term f(X1)·f(X2) is a squared term in field Fq;
At step /2/-/iii/, it is tested whether the term f(X1) is a squared term in the finite field Fq according to the following steps:
calculate R2' such that:

$$R'_2 = f(X_1)^{q-1-\frac{q+1}{4}}$$

calculate R3' such that:

$$R'_3 = R'^2_2$$

calculate R4' such that:

$$R'_4 = R'_3 \cdot f(X_1)$$

if R4' is not equal to 1, at step /2/-/iv/, the square root of f(X2) is obtained according to the following equation:

$$\sqrt{f(X_2)} = R_1 \cdot R'_2$$

This embodiment is general and can easily be applied to the whole family of polynomials that satisfy Skalba's equality. It should be noted that, ingeniously, in the case when the squared term in Skalba's equality (2) is f(X2), i.e. the last term to be checked of the three terms of Skalba's equality, it is not necessary to perform a new exponentiation of the type $$f(X_1)^{q-1\frac{q+1}{4}}.$$

In fact, the term R2' can be used advantageously to obtain the square root of the term f(X2). It is thus guaranteed that only two exponentiations at most are employed during execution of a method according to one embodiment of the present invention.

In one embodiment of the present invention, the polynomials satisfying Skalba's equation in X and Y are expressed in Jacobian coordinates in X', Y' and Z such that:

$$X' = X \cdot Z^2$$

$$Y' = Y \cdot Z^3$$

and the operations of inversion are transformed into operations of multiplication.

The transformation into Jacobian coordinates makes it possible to transform the inversions into multiplications, when the term Z is correctly selected.

In one embodiment of the present invention, the polynomials that satisfy Skalba's equality are expressed in Jacobian coordinates, according to which the point P(X,Y) is written P(X',Y',Z) such that:

$$X'=X \cdot Z^2$$

$$Y'=Y \cdot Z^3$$

where the function f is written f z(X') and satisfies:

$$fz(X')=X'^3+a \cdot X' \cdot Z^4+b \cdot Z^6$$

with the elliptical curve satisfying the equation:

$$y \cdot 2 = fz(X')$$

and the polynomials satisfying Skalba's equality expressed in Jacobian coordinates are X'1(t), X'2(t), X'3(t), Z(t) and U'(t) and satisfy Skalba's equality in Jacobian coordinates:

$$U'(t)^2 = fzct)(X\backslash(t)) \cdot fzct)(X'_2(t) \cdot fzct)(X'_3(t))$$

with Z(t) determined in such a way that the operations of inversion are transformed into operations of multiplication.

Here it is a question of applying a transformation in Jacobian coordinates to the Ulas polynomials satisfying Skalba's equality, as stated previously. In this case, it is possible to limit the number of exponentiations to two, and at the same time eliminate any calculation of inversion, while ensuring execution in a constant time of a determination of a point P on the elliptical curve.

In one embodiment, the polynomials that satisfy Skalba's equality are such that it is possible to set the value of X3(t) for any possible t, such that f(X3(t)) is never a squared term in Fq, in which, at step /2/-/ii/, the term f(X1)·f(X2) is not a squared term in the finite field Fq, in which, at step /2/-/iii/, it is tested whether the term f(X1) is a squared term in the finite field Fq according to the following steps:

calculate R2' such that:

$$R'_2 = f(X1)^{\frac{q+1}{q-1-4}}$$

calculate R3' such that:

$$R'_3 = R'_2{}^2$$

calculate R4' such that:

$$R'_4 = R'_3 \cdot f(X_1)$$

in which, if R4' is not equal to 1, at step /2/-/iv/, the square root of f(X2) is obtained according to the following equation:

$$\sqrt{f(X_2)} = R_1 \cdot R'_2 \text{ where}$$

$$R1 = (f(X1) \cdot f(X_{2)})^{\frac{q+l}{4}}$$

in which R1 is obtained beforehand from the following equation:

$$R_1 = (I(X) \cdot f(X_{2)})^{\frac{q+l}{4}} = U \cdot f(u)^{\frac{q-1-q+1}{4}}$$

Thus, in a particular case, it is possible to limit the number of exponentiations to be performed even further by using a particular family of polynomials, such that it is possible to set the value of X3(t) for any possible t, such that f(X3(t)) is never a squared term in Fq. The family of Ulas polynomials as described in the document 'Rational points on certain hyperelliptical curves over finite fields' by Macie Ulas, dated 11 Jun. 2007 can advantageously be used here.

For such a family of polynomials that satisfy Skalba's equality, we can write:

$$X_1(t, u) = -j)_a \left[ 1 + \frac{1-J}{t^4 f(u) + t^2 f(u)} \right]$$

$$X_2(t, u) = t^2 f(u) X_1(t, u)$$

$$X_3(t, u) = u$$

$$U(t, u) = t^3 f(u)^4 f(X_1(t, u))$$

where $f(u)=u^3+au+b$ where a and b are elements of Fq such that their product is not zero.

These polynomials can be used advantageously in determining a set value of the parameter u such that f(X3)=f(u) is not a squared term in Fq, Thus, at step /2/-/ii/, the term $f(X_1) \cdot f(X_2)$ is not a squared term in the finite field Fq, then, at step /1/-/iii/, it is tested whether the term $f(X_1)$ is a squared term in the finite field Fq according to the following steps:

calculate R2' such that:

$$R = f(X1)^{\frac{q+1}{q-1-4}}$$

calculate R3' such that:

$$R'_3 = R'_2{}^2$$

calculate R4' such that:

$$R'_4 = R'_3 \cdot f(X_1)$$

Then, if $R_{4'}$ is not equal to 1, at step /1/-/iv/, the square root of $f(X_2)$ is obtained according to the following equation:

$$\sqrt{f(X_2)} = R_1 \cdot R'_2 \text{ where}$$

$$R_1 = (F(X_1) \cdot f(X_2))^{\frac{q+1}{4}}$$

R1 can advantageously be obtained beforehand according to the following equation:

$$R1 = (f(X) \cdot f(X_{2)})^{\frac{q+1}{4}} = U \cdot f(u)^{q-1\frac{q+1}{4}}$$

In particular, the term $$f(u)^{q-1\frac{q+1}{4}}$$

can be calculated in advance. This is possible as f(u) is also calculated in advance. In this particular case of polynomials that satisfy Skalba's equality, it is therefore possible not to have to perform the exponentiation relating to the calculation of $$(f(X_1(t)) \cdot f(X_2(t)))^{\frac{q+1}{4}}$$

during application of the method, but just the multiplication $$U(t) \cdot (f(u))^{q-1\frac{q+1}{4}}$$

Thus, application of such a method then corresponds to a single exponentiation, that of the calculation of $$R_i = f(X_1)^{q-1\frac{q+1}{4}}$$

In this context, these particular polynomials are expressed in Jacobian coordinates according to which the point P(X,Y) is written P(X',Y',Z) such that:

$$X'=X \cdot Z^2.$$

$$Y'=Y \cdot Z^3$$

where the function f is written f z(X') and satisfies:

$$fz(X')=X'^3+a \cdot X' \cdot Z^4+b \cdot Z^6$$

with the elliptical curve satisfying the equation:

$$y \cdot 2=fz(X')$$

where the polynomials that satisfy Skalba's equality expressed in Jacobian coordinates are $X'_1(t)$, $X'2(t)$, $Z(t)$ and $U'(t)$ and satisfy Skalba's equality in Jacobian coordinates:

$$U'(t)^2 = fzctJ(X\backslash(t)) \cdot fzctJ(X'_2(t)) \cdot f(X_3(t))$$

and where Z(t) is determined in such a way that the operations of inversion are transformed into operations of multiplication.

At step /1/, the value of the parameter t can be obtained as a function of a password or an identifier. It is thus possible to envisage using the password directly or a derivative of the password as parameter.

In one embodiment of the present invention, the cryptographic application is an application of authentication or identification by a checking entity, and at step /1/, the following steps are executed:

/a/ generate a random value;

/b/ obtain an encrypted value by encrypting said random value based on an encryption function using an encryption key determined from a password or identifier corresponding to the parameter; and /c/ transmit the encrypted value to the checking entity.

By following this procedure, the checking entity is able to obtain the random value as a function of the encrypted value received from the password. Then it recovers the value of the parameter t by applying a suitable function.

A second aspect of the present invention proposes an electronic device comprising suitable means for applying a method of execution of a cryptographic calculation according to the first aspect of the present invention.

Other aspects, aims and advantages of the invention will become clear on reading the description of one of its embodiments.

BRIEF DESCRIPTION OF THE DRAWINGS

The invention will also be better understood with the aid of the following figures.

DETAILED DESCRIPTION OF THE DRAWINGS

Figure 1:
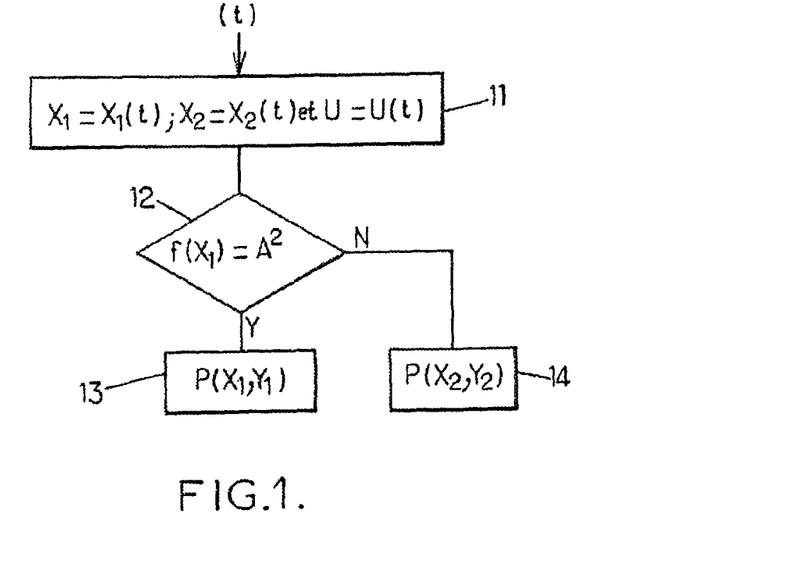
FIG. 1 shows the main steps of a method of execution of a cryptographic calculation according to one embodiment of the present invention.

FIG. 1 shows the main steps of a method of execution of a calculation according to one embodiment of the present invention.

Figure 4:
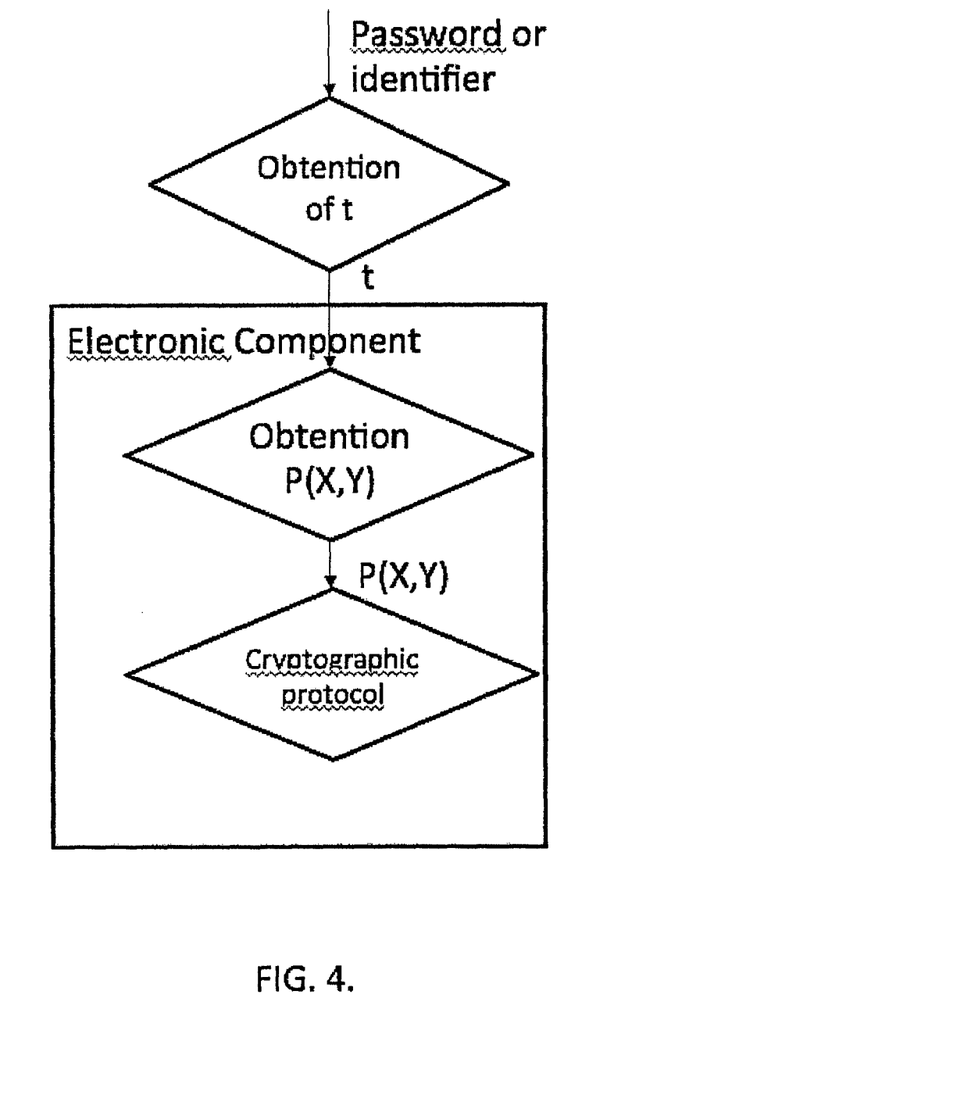
FIG. 4 shows the processing steps performed by an electronic component used to execute the cryptographic calculation according to one embodiment of the present invention.
Figure 5:
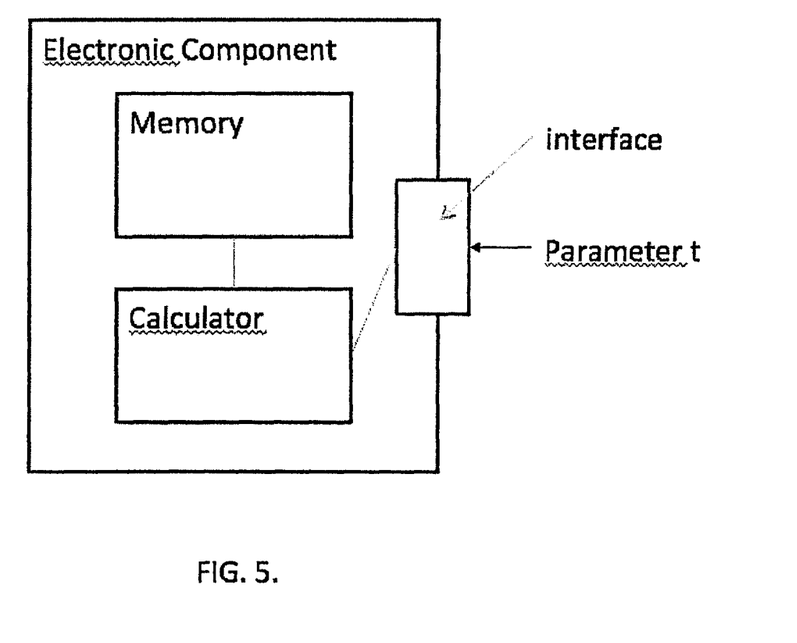
FIG. 5 is a block diagram showing the elements of an electronic component used to perform the processing shown in FIGS. 1-4.

These main steps are suitable for determining a point on an elliptical curve with the aim of using said point in a cryptographic application. A cryptographic calculation of this kind can be executed in an electronic component in a secure manner, i.e. without the determination of this point giving any information on the point determined. FIGS. 4 and 5 provide further details regarding the processing performed by the electronic component (FIG. 4), and the elements used to implement the electronic component (FIG. 5).

This calculation comprises, in a finite field Fq, where q is equal to 3 mod 4, a step of obtaining a point P(X,Y) on an elliptical curve satisfying the equation:

$$Y^2=f(X)$$

A point P(X,Y) has its abscissa X which corresponds to one of X1(t), X2(t) and X3(t), for a value of t obtained, such that:

$$f(X_1(t)) \cdot f(X_2(t)) \cdot f(X_3(t))=U^2(t) \quad (2)$$

where X1(t), X2(t), X3(t) and U(t) are polynomials satisfying Skalba's equation in the finite field Fq.

More precisely, the polynomials that satisfy Skalba's equality, as defined in the document 'Rational points on certain hyperelliptic curves over finite fields' by Maciej Ulas, dated 11 Jun. 2007 are functions of two parameters u and t. In the context of the present invention, one of the parameters can advantageously be set and consequently the polynomials satisfying Skalba's equation are then functions of a single parameter t.

In order to determine a point on the curve, we try to determine, for given input parameters u and t, those among the values X1=X1(t,u), X2=X2(t,u), X3=X3(t,u) that correspond to a squared term in the finite field Fq. For this purpose, application of two different processings is advantageously envisaged depending on whether or not the term f(X1)·f(X2) is a squared term in the finite field Fq.

At an initial step 100, the parameter t is taken into account and we calculate:

$$Xi = Xi(t) \text{ for } i \text{ between 1 and 3,}$$

and $$U = U(t)$$

At a step 11, we decide whether this product $f(X1) \cdot f(X2)$ is a squared term. This decision can be based on previous calculations or can be based on a check during application of the method. If the term $f(X1) \cdot f(X2)$ is a squared term then the term $f(X3)$ is also a squared term. In this case it is envisaged to calculate the square root of the term $f(X3)$, at a step 12. At a step 16, the point P thus determined has X3 as abscissa and Y3 as ordinate satisfying the following equation:

$$Y_3 = \sqrt{f(X3)}$$

It should be noted that if the product $f(X1) \cdot f(X2)$ is a squared term, it follows that the term $f(X3)$ is also a squared term. However, in order to keep determination of a point on the elliptical curve to a constant time, application of a test 10 is envisaged, so as to check that the term $f(X3)$ is actually a squared term. This test 10 makes it possible to guarantee application of the method according to one embodiment of the present invention in a constant time.

In the other case, i.e. when the term $f(X1) \cdot f(X2)$ is not a squared term, we can deduce from this that either $f(X1)$, or $f(X2)$ is a squared term. We can therefore envisage checking, firstly, whether the term $f(X1)$ is a squared term at a step 13. If the test is positive, its square root is then calculated at a step 14 in order to obtain the abscissa of the point P:

$$Y_1 = \sqrt{f(X1)}$$

At a step 17, we then obtain the point P which has X1 as ordinate and Y1 as abscissa.

If the test at step 13 is negative, it can then be deduced from this that the term $f(X2)$ is a squared term. Consequently, at a step 15 we obtain the abscissa Y2 of a point P on the elliptical curve according to the equation:

$$Y_2 = \sqrt{f(X2)}$$

A point P(X2, Y2) of the curve can thus be supplied at a step 18.

It should be noted that reaching steps 16, 17 or 18 for obtaining a point on the elliptical curve according to one embodiment of the present invention requires similar operations. Thus, regardless of the input parameters t and u, it is not possible to launch an attack on the basis of the time elapsed.

The point P(Xi,Yi), for an i between 1 and 3, can then be used advantageously in a cryptographic application of encryption or hashing or signature or authentication or identification, since its determination has not supplied any element that can break its secret.

In the field Fq, q corresponding to 3 mod 4, it is possible to check whether a term is a squared term in various ways. The tests for a squared term such as tests 10 and 13 in FIG. 1 can be performed as follows. In one embodiment of the present invention, when trying to determine whether a term A is a squared term in Fq, the following steps can be executed:

$$W_{1'} = \frac{1}{A_4^{q+1}} = A_4^{q-1-q+1} \quad \text{(i)}$$

$$W_2 = W_1^2 \quad \text{(ii)}$$

$$W_3 = W_2 \cdot A \quad \text{(iii)}$$

Finally, if term A is a squared term then:
W1 corresponds to the reciprocal of the square root of A, i.e. ||JA, since an exponentiation at (q−1) corresponds to an inversion and an exponentiation at (q+1)/4 corresponds to a square root in the finite field Fq;
W2 corresponds to the inverse of A; and
W3 corresponds to the value 1.

Thus, when W3 is equal to the value 1, it is concluded from this that the term A is a squared term in the finite field Fq. If A is not a squared term then W3 is not equal to 1.

Figure 2:
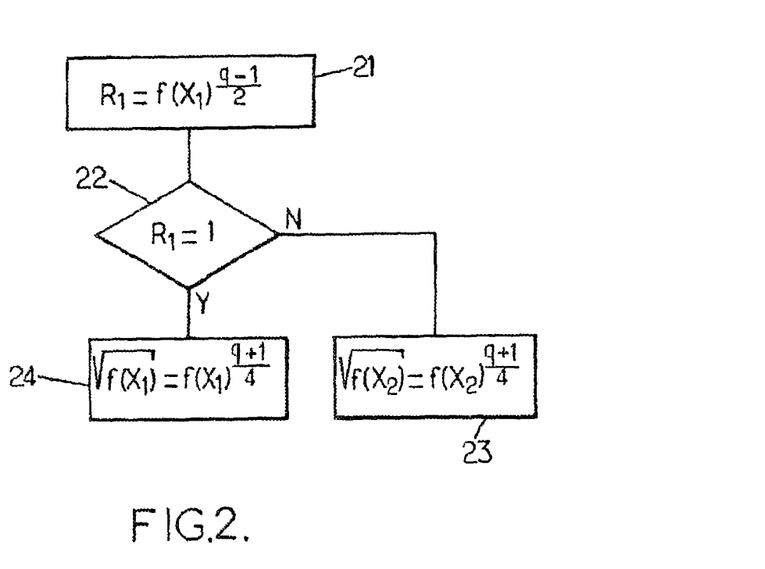
FIG. 2 shows a method of execution of a cryptographic calculation in detail according to one embodiment of the present invention.

FIG. 2 illustrates the implementation of a method of execution of a calculation according to one embodiment of the present invention.

In one embodiment of the present invention, at a step 201, the following multiplication is performed:

$$Ro = f(X1) \cdot f(X2)$$

Then it is checked whether this term Ro is a squared term by applying steps (iv) and (v). Thus, at a step 202, we calculate: $_R\text{-}R\,(q+1)14$ Then, at step 203, we determine whether the following equation is satisfied:

$$R_1^2 = R_0 \quad \text{(v)}$$

It is decided whether the term Ro, equal to $f(X1) \cdot f(X2)$, is a squared term or not. In the case where the term Ro is a squared term, a test is applied with the aim of determining whether the term $f(X3)$ is a squared term. The result of the latter test is known beforehand since if Ro is a squared term, then this test is positive. However, for the purpose of ensuring a constant time, it is advisable to apply it according to steps (i) to (iii).

Thus, at a step 204, the following calculation is performed:

$$R2 = f(X3)(q-^1-(q-^1|^4|)$$

Here, R2 corresponds to calculation of the reciprocal of the square root of $f(X3)$, in the case when $f(X3)$ is a squared term.

Then, at a step 205, the following equation is calculated:

$$R_3 = R_2^2$$

Here, R3 corresponds to the inverse of $f(X3)$.

Then, at a step 206, R3 is multiplied by the term $f(X3)$, obtaining a term R4. As we know that $f(X3)$ is a squared term, we also know that the term R4 is equal to 1. These steps 205 and 206 are employed in order to guarantee determination of a point P on the elliptical curve in a constant time.

At a step 207, it is therefore tested whether the term R4 corresponds to 1. In the present case, this test is always positive, since it follows from test 203.

Then, at a step 208, the following calculation is performed:

$$Rs = R2 \cdot f(X3)$$

Here, a point P on the curve is obtained which has X3 as abscissa and, as ordinate, the square root of $f(X3)$, i.e. the value Rs.

In the case when, at step 11, it is decided that the term $f(X1) \cdot f(X2)$ is not a squared term, then either the term $f(X1)$ or the term $f(X2)$ is a squared term.

Next it is a matter of determining which of these two terms $f(X1)$ and $f(X2)$ corresponds to a squared term.

For this purpose, operations similar to those described previously are carried out, except that in this case, the term f(X1) need not be a squared term.

At a step 211, the following equation is calculated:

$$R'2 = f(X1)_q{-1-(q+1)/4}$$

In the case when f(X1) is a squared term, R'2 corresponds to the value of the reciprocal of the square root of f(X1) as described for step (i). Then this last-mentioned term is squared, at a step 212:

$$R'_3 = R'^2_2$$

in order to obtain the inverse of f(X1) in the case when f(X1) would be a squared term.

Thus, on multiplying R3' by the term f(X1), we obtain R4' at a step 213, which has the value 1 if the term f(X1) is actually a squared term. In this case, the test carried out at a step 214, during which the term R4' is compared with the value 1, is positive.

Then, the following calculation is performed at a step 215:

$$R'_5 = R'2 \cdot f(X1)$$

The term R'₅ then corresponds to f(X1).

A point P on the curve is obtained with X1 as abscissa and R's as ordinate.

In the case when test 214 is negative, the term f(X1) is not a squared term. Then, it follows from this that the squared term in Skalba's equation (2) is the term f(X2). In this case, at a step 216, the following calculation is performed:

$$R''_5 = R_1 \cdot R'_2$$

It should be noted that the above equation makes it possible to obtain advantageously the square root of f(X2) but without carrying out an operation of exponentiation such as that carried out at step 204 or also at step 211. In fact, here it is, ingeniously, a matter of performing a multiplication instead of an exponentiation.

We then obtain Rs", which corresponds to the term f(X2), supplied at a step 216. Thus, a point P on the elliptical curve has been determined which has X2 as abscissa and Rs" as ordinate.

In the embodiment described previously with reference to FIG. 2, regardless of the determination of point P, i.e. whether this determination is based on the value X1 or X2 or X3, similar calculations are employed, thus ensuring determination of a point on the elliptical curve in a constant time.

More precisely, two operations of exponentiation are employed, one exponentiation at step 202 and another exponentiation at step 204 or 211 depending on the result of test 203. Thus, it is no longer necessary to perform four exponentiations to determine a point on a curve in the context of Skalba polynomials in a constant time.

In one embodiment of the present invention, it is possible to select polynomials that satisfy Skalba's equality in such a way that the polynomial f(X3(t)) can never correspond to a squared term whatever the value of t. In this case, Skalba's equation:

$$f(X_1(t)) \cdot f(X_2(t)) \cdot f(X_3(t)) = U^2(t) \quad (2)$$

can be written in the form:

$$f(X_1(t)) \cdot f(X_2(t)) \cdot f(X_3(t))_4^{q+1} = U(t)2_4^{q+1} = U(t)$$

then also in the form:

$$(f(X_1(t)) \cdot f(X_2(t)))^{\frac{q+1}{4}} \frac{U(t)}{f(X3(t))^{\frac{q+1}{4}}}$$

and also as:

$$(f(X1(t)) \cdot f(X_2(t)))^{\frac{q+1}{4}} = U(t) \cdot (f(X_3(t))^{q-1\frac{q+1}{4}} \quad (4)$$

All these equations are only valid if the condition q=3 mod 4 is satisfied. Now, if the term $$(f(X_3(t))^{q-1\frac{q+1}{4}}$$

of this last-mentioned equation corresponds to a set value, we are able to calculate the value of the term $$R_1 = (f(X_1) \cdot f(X_2))^{\frac{q+1}{4}}$$

efficiently using the multiplication $$U \cdot (f(X_3(t))^{q-1\frac{q+1}{4}}.$$

In this case, a point on the elliptical curve can be determined using just one operation of exponentiation, that corresponding to step 204 of test 10, or that corresponding to step 211 of test 13, as appropriate.

These conditions can be fulfilled using for example a set of polynomials satisfying Skalba's equation as described in the document 'Rational points on certain hyperelliptic curves over finite fields' by Macie Ulas, dated 11 Jun. 2007. In this document, the polynomials satisfying Skalba's equation (2) are described:

$$X_1(t, u) = -\}\}_a \left[1 + \frac{1-J}{t^4 f(u) + t^2 f(u)}\right]$$

$$X_2(t, u) = t^2 f(u) X_1(t, u)$$

$$X_3(t, u) = u$$

$$U(t, u) = t^3 f(u)^4 f(X_1(t, u))$$

where $f(u) = u3 + au + b$ where a and b are elements of Fq such that their product is not zero.

Thus, by determining a value of u that is set and that does not correspond to a squared term in Fq, the value of R1 is then a set value that can be pre-calculated according to equation (4), for any determination of point P according to one embodiment of the present invention.

Figure 3:
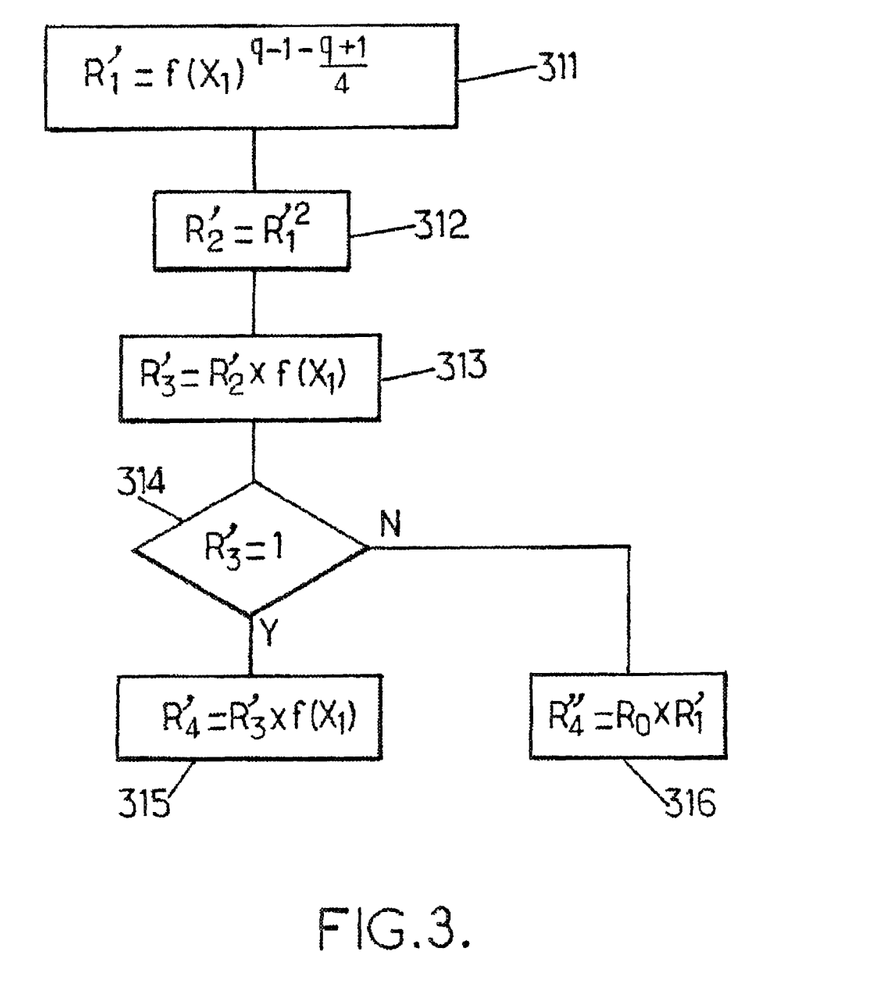
FIG. 3 shows a method of execution of a cryptographic calculation in detail according to one embodiment of the present invention in the particular case of Ulas polynomials.

FIG. 3 illustrates a method of execution of a cryptographic calculation in detail according to one embodiment of the present invention in the particular case of Ulas polynomials, for a set polynomial X3(t,u) according to one embodiment of the present invention. In this case, steps 211 to 216 alone can be employed. If step 216 is executed, then the value R1 can be recovered from a memory area as it was calculated previously.

Accordingly, the number of exponentiations required for determining a point on the curve can be further reduced, to a single exponentiation, that which corresponds to test 10 or to test 13.

In one embodiment of the present invention, the use of Jacobian coordinates is advantageously envisaged. This transformation to Jacobian coordinates makes it possible to transform the operations of inversion into operations of multiplication which are quicker and easier to apply. It should be noted that such an embodiment cannot be applied to all curves of the Skalba type, including to the particular case of Ulas curves.

The equation of an elliptical curve:

$$X^3 + aX + b = Y^2$$

can be written in Jacobian coordinates:

$$X'^3 + aX'Z'^4 + bZ'^6 = Y'^2$$

It should be noted that the coordinates of a point (X,Y) can be written in Jacobian coordinates (X',Y',Z') such that:

$$X' = X \cdot Z2 \text{ and}$$

$$Y' = Y \cdot Z^3$$

We should therefore determine a polynomial Z(t,u) in such a way that the Jacobian coordinates X', Y' and Z can be written without inversion.

In the following sections, this transformation into Jacobian coordinates is applied to a particular case, that of Ulas curves as described previously.

In this context, any operation of inversion is eliminated by taking:

$$Z(t,U) = a(t^4 f(u)^2 + t^2 f(u))$$

in which u is set.

In fact, the Ulas polynomials can then be written in the following form in Jacobian coordinates:

$$X'_1(t,u) = -b \cdot Z(t,u)(t^4 f(u)2 + t^2 f(u) + l)$$

$$X'_2(t,u) = t^2 \cdot f(u) \cdot X'_1(t,u)$$

$$X'_3(t,u) = u$$

It should therefore be noted that there is no longer any inversion in Jacobian coordinates. As this operation can be as costly as an exponentiation, these coordinates permit a significant improvement in calculation time.

Then, to obtain the Jacobian coordinate Y', it is advisable to calculate U'(t,u), the equivalent of U(t,u) in Jacobian coordinates.

In this context, in classical coordinates we have:

$$U(t,u)^2 = f(X_1(t,u)) \cdot f(X_2(t,u)) \cdot f(X_3(t,u))$$

We can then write in Jacobian coordinates:

$$U(t,u)^2 = f(X'_1(t,u)|Z(t,u)2) \cdot f(X'_2(t,u)|Z(t,u)2) \cdot f(X'_3(t,u)|Z(t,u)2)$$

By writing:

$$f = (t)(X') = X'^3 + a \cdot X' \cdot Z(t)^4 + b \cdot Z(t)^6 = Z^6 \cdot f(\ )$$

we obtain the following equation:

$$Z^{18}(t,u) \cdot U(t,u)^2 = (Z(t,u)^9 \cdot U(t,u)^2 = fz(t,u)(X'i(t,u)) \cdot fz(t,u)(X'^2(t,u))) \cdot fz(X'_3(t,u))$$

Then:

$$U'(t,u) = Z(t,u)^9 \cdot U(t,u)$$

where U'(t,u) is the expression of U(t,u) in Jacobian coordinates.

In the case where it is considered that U(t,u) satisfies the equation:

$$U(t,u) = t^3 \cdot f(u)^2 \cdot |(X_2(t,u))$$

we can then write:

$$U'(t,u) = t^3 \cdot f(u)2 \cdot fz(t,u)(X'_2(t,u))Z(t,u)^3$$

Skalba's equality becomes, in Jacobian coordinates:

$$U'(t,u)^2 = Jz(t,u)(X\backslash(t,u)) \cdot Jz(t,u)(X'_2(t,u)) \cdot Jz(t,u)(X'_3(t,u))$$

Nevertheless, as in the case of Ulas polynomials it is possible to require
that x'3(t,u) is such that fz(t,u)(X'3(t,u) is never a square. In this case, we have:

$$U'(t,u) = t^3 \cdot f(u)2 \cdot fZ(t,u)(X'_2(t,U))$$

and the corresponding Skalba equality is:

$$U'(t,u)^2 = fz(t,u)(X'i(t,u)) \cdot fz(t,u)(X'_2(t,u)) \cdot f(X'_3(t,u))$$

The present invention can advantageously be implemented in any type of cryptographic calculation using elliptical curves. It can in particular be advantageous in protocols for authentication by password, such as PACE (Password Authenticated Connection Establishment). In this case, it allows an improvement in calculation performance, while not allowing any attack linked to the execution time of the cryptographic calculation.

The electronic component used to perform a disclosed cryptographic calculation may be any type of general purpose or dedicated computer which has been programed to receive the necessary inputs, perform the desired calculations, and provide the resulting output. By way of example, such a computer could be in the nature of a controller, micro-controller, field programmable gate array (FPGA), or application specific integrated circuit (ASIC).

The processing performed by such electronic computer includes obtention 411 of a password identifier t which is provided as an input to obtain a point P(X,Y) 413 which is then used to perform a cryptographic calculation using one of the above-described cryptographic protocols according to one of the disclosed embodiments of an execution method according to the present invention.

FIG. 5 discloses an electronic component of the type which may be utilized in the present invention. The electronic component includes a memory 513, a calculator 515 and an interface 517. It is much as such memory, calculator and interface are well known components of the type implemented in known channel purpose or dedicated computers, no further details are necessary in order for a person having ordinary skill in the art to implement such electronic component.

The present invention can also be applied advantageously in the context of privacy protocols, such as those used for checking electronic identity documents, such as electronic passports.

The invention claimed is:

1. An electronic component configured to execute a cryptographic calculation and to obtain a point P(X,Y) from at least one parameter t, on an elliptical curve that satisfies the equation: $Y^2 = f(X)$ and from polynomials $X_1(t)$, $X_2(t)$, $X_3(t)$ and U(t) satisfying the following Skalba equality: $f(X1(t)) \cdot f(X2(t)) \cdot f(X3(t)) = U(t)^2$ in a finite field $F_q$, regardless of the parameter t, q satisfying the equation q=3 mod 4, wherein said electronic component is configured to:
  obtain a value of the parameter t; and
  determine the point P by:
  (i) calculating $X_1=X_1(t)$, $X_2=X_2(t)$, $X_3=X_3(t)$ and $U=U(t)$;
  (ii) if the term $f(X1)·f(X2)$ is a squared term in the finite field Fq then testing whether the term $f(X_3)$ is a squared term in the finite field Fq and calculating the square root of the term $f(X_3)$, the point P having $X_3$ as abscissa and the square root of the term f(X3) as ordinate;
  (iii) otherwise, testing whether the term $f(X_1)$ is a squared term in the finite field Fq and in this case, calculating the square root of the term $f(X_1)$, the point P having $X_1$ as abscissa and the square root of the term $f(X_1)$ as ordinate; and
  (iv) otherwise, calculating the square root of the term $f(X_2)$, the point P having $X_2$ as abscissa and the square root of the term $f(X_2)$ as ordinate;
  wherein said electronic component is further configured to use said point P in a cryptographic application selected from the group consisting of encryption or hashing or signature or authentication or identification,
  wherein the cryptographic calculation is an application of authentication or identification by a checking entity, and
  wherein obtaining the value of the parameter t further comprises:
  /a/ generating a random value;
  /b/ obtaining an encrypted value by encrypting said random value based on an encryption function using an encryption key determined from a password or identifier corresponding to the parameter; and
  /c/ transmitting the encrypted value to the checking entity.

2. The electronic component according to claim 1, wherein in order to determine the point P said electronic component is further configured to:
  calculate $R_1$ such that:

$$R_1 = (f(X_1) \cdot f(X_2))^{\frac{q+1}{4}};$$

if $R_1^2$ is equal to $f(X1)·f(X_2)$, then decide whether the term $f(X1)·f(X_2)$ is a squared term in the field $F_q$; and
  test whether the term $f(X_1)$ is a squared term in the finite field $F_q$ by:
  calculating $R'_2$ such that:

$$R'_2 = f(X_1)^{q-1-\frac{q+1}{4}};$$

calculating $R'_3$ such that:

$R'_3=R'^2_2$; and calculating $R'_4$ such that:

$R'_4=R'_3·f(X_1)$ if $R'_4$ is not equal to 1, obtain the square roof of the term $f(X_2)$ from the following equation:

$\sqrt{f(X_2)}=R_1·R'_2$.

3. The electronic component according to claim 1, wherein the polynomials that satisfy Skalba's equality are expressed in Jacobian coordinates according to which the point P(X,Y) is written P(X',Y',Z) such that:

$X'=X·Z^2$, $Y'=Y·Z^3$ wherein the function f is written $f_z(X')$ and satisfies :

$f_z(X')=X'^3+a·X'·Z^4+b·Z^6$ with the elliptical curve satisfying the equation:

$Y'^2=f_z(X')$ in which the polynomials that satisfy Skalba's equality expressed in Jacobian coordinates are $X'_1(t)$, $X'_2(t)$, $X'_3(t)$, $Z(t)$ and $U'(t)$ and satisfy Skalba's equality in Jacobian coordinates:

$U'(t)^2=f_{Z(t)}(X'_1(t))·f_{Z(t)}(X'_2(t))·f_{Z(t)}(X'_3,(t))$ and in which $Z(t)$ is determined in such a way that operations of inversion are transformed into operations of multiplication.

4. The electronic component according to claim 1, wherein the polynomials that satisfy Skalba's equality are such that it is possible to set a value of $X_3(t)$ for any possible t, such that $f(X_3(t))$ is never a squared term in Fq, and
  wherein when determining the point P, the term $f(X_1)·f(X_2)$ is not a squared term in the finite field $F_q$,
  wherein determining the point P further comprises testing whether the term $f(X_1)$ is a squared term in the finite field $F_q$ by:
  calculating $R'_2$ such that:

$$R'_2 = f(X_1)^{q-1-\frac{q+1}{4}};$$

calculating $R'_3$ such that:

$R'_3=R'^2_2$; and calculating $R'_4$ such that:

$R'_4=R'_3·f(X_1)$ wherein, if $R'_4$ is not equal to 1, determining the point P further comprises obtaining the square root of the term $f(X_2)$ according to the following equation:

$\sqrt{f(X_2)}=R_1·R'_2$ where $$R_1 = (f(X_1) \cdot f(X_2))^{\frac{q+1}{4}}$$

in which R1 is obtained beforehand from the following equation:

$$R_1 = (f(X) \cdot f(X_2))^{\frac{q+1}{4}} = U \cdot f(u)^{q-1-\frac{q+1}{4}}.$$

5. The electronic component according to claim 4, wherein the polynomials that satisfy Skalba's equality are expressed in Jacobian coordinates according to which the point P(X,Y) is written P(X',Y',Z) such that:

$X'=X·Z^2$, $Y'=Y·Z^3$ where the function f is written $f_z(X')$ and satisfies:

$f_z(X')=X'^3+a·X'·Z^4+b·Z^6$ with the elliptical curve satisfying the equation:

$Y'^2=f_z(X')$ in which the polynomials that satisfy Skalba's equality expressed in Jacobian coordinates are X'1(t), X'2(t), Z(t) and U'(t) and satisfy Skalba's equality in Jacobian coordinates:

$$U'(t)^2 = f_{Z(t)}(X'_1(t)) \cdot f_{Z(t)}(X'_2(t)) \cdot f(X_3(t)) \qquad 5$$

and in which Z(t) is determined in such a way that operations of inversion are transformed into operations of multiplication.

6. The electronic component according to claim 1, wherein obtaining the value of the parameter t comprises obtaining the value of the parameter t as a function of a password or an identifier.

\* \* \* \* \*